(12) United States Patent
Fujikawa

(10) Patent No.: US 6,459,466 B1
(45) Date of Patent: *Oct. 1, 2002

(54) LIQUID-CRYSTAL DISPLAY DEVICE WITH IMPROVED YIELD OF PRODUCTION AND METHOD OF FABRICATING THE SAME

(75) Inventor: Tetsuya Fujikawa, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/347,651

(22) Filed: Jul. 6, 1999

(30) Foreign Application Priority Data

Jul. 7, 1998 (JP) ........................................... 10-192010

(51) Int. Cl.[7] .................... G02F 1/136; G02F 1/1343; G02F 1/1345
(52) U.S. Cl. ........................... 349/149; 349/43; 349/46; 349/139
(58) Field of Search ............................ 349/149, 43, 46; 257/59, 72; 438/30

(56) References Cited

U.S. PATENT DOCUMENTS 5,359,206 A * 10/1994 Yamamoto et al. ............ 257/59
5,719,408 A * 2/1998 Yamamoto et al. ............ 257/59
5,767,827 A * 6/1998 Kobayashi et al. ............ 345/87
5,835,177 A * 11/1998 Dohjo et al. ................ 349/147

* cited by examiner

Primary Examiner—William L. Sikes
Assistant Examiner—Julie Ngo
(74) Attorney, Agent, or Firm—Greer, Burns & Crain, Ltd.

(57) ABSTRACT

The present invention provides a liquid-crystal display device having a first insulation base, a second insulation base facing the first insulation base such that a space is defined between the first insulation base and the second insulation base, in the following conditions:

The space between the first insulation base and the second insulation base is filled with a liquid-crystal layer and is sealed with the first insulation base, the second insulation base and supporting members. Accordingly, a display area is provided on the sealed surface area of the first insulation base so as to face the second insulation base and includes thin-film transistors. Also, a terminal area is provided on the not-sealed surface area of the first insulation base and has terminal electrodes that connect electrically to corresponding thin-film transistors formed in the display area, respectively.

Moreover, projections are provided in the terminal area such that heights of the projections are equal to or more than those of the thin-film transistors.

6 Claims, 7 Drawing Sheets

US 6,459,466 B1

LIQUID-CRYSTAL DISPLAY DEVICE WITH IMPROVED YIELD OF PRODUCTION AND METHOD OF FABRICATING THE SAME

BACKGROUND OF THE INVENTION

1. Field of the Invention

The present invention generally relates to liquid-crystal display devices and methods of fabricating the same, and more particularly to a Thin Film Transistor (TFT) liquid-crystal display device and a method of fabricating the same.

2. Description of the Related Art

Recently, liquid-crystal display devices for use with information processors such as computers are widely used because of their portable size and low power consumption.

Especially to realize high quality color display, an active matrix method that controls each pixel electrode is widely applied to liquid-crystal display devices.

FIG. 1 shows a diagram of a conventional active-matrix-type liquid-crystal display device. Referring to FIG. 1, a liquid-crystal display device 10 includes a first TFT glass base 11 having a plurality of TFTs and transparent pixel electrodes cooperating therewith and a second glass base 12. A liquid-crystal layer 1 between the first TFT glass base 11 and the second glass base 12 is sealed by sealing members. In the liquid-crystal display device 10, the transparent pixel electrode may be selected turned ON through the TFT so that a orienting direction of liquid-crystal molecules is altered by the selected transparent pixel electrode. A polarization plate (not shown) is arranged in a cross Nicol state. Moreover, molecule orientation films are provided inside of the TFT glass base 11 and the glass base 12 to suppress orienting directions of liquid-crystal molecules.

FIG. 2 shows a part of the TFT glass base 11 under magnification.

Referring to FIG. 2, on the TFT glass base 11, a plurality of pad electrodes 11A supply scan signals and a plurality of scan electrodes 11a are extend therefrom. Also, a plurality of pad electrodes 11B supply image signals and a plurality of signal electrodes 11b are extended therefrom. The extending direction of the scan electrodes 11a and that of signal electrodes 11b cross each other. TFTs 11C are provided at every point of intersection of the scan electrodes 11a and signal electrodes 11b. Furthermore, a transparent pixel electrode 11D is provided to each TFT 11C. A row of TFTs 11C is selected by a scan signal from a corresponding scan electrode 11a and then a particular transparent pixel electrode 11D is operated by an image signal from a corresponding signal electrode 11b.

FIGS. 3A, 3B, 3C and 3D show sectional views illustrating production steps of a conventional liquid-crystal display device. In these figures, every left side shows a display area including a TFT 11C and every right side shows a terminal area including pad electrodes 11A and 11B.

Referring to FIG. 3A, in the display area, an Al—Nd or Al—Sc alloy pattern 22A that is connected to the scan electrode 11a is formed as a gate electrode 22A on a glass base 21 corresponding to the first TFT glass base 11 in FIG. 1. Simultaneously, in the terminal area on the glass base 21, terminal electrodes 22B, which are made up of an Al—Nd or Al—Sc alloy pattern, corresponding to the pad electrode 11A or 11B are formed.

Subsequently, in the display area in FIG. 3B, a gate insulation film 23A that is made up of SiN is layered over the gate electrode 22A. Moreover, an n⁻type impurity doped amorphous silicon layer 24A is layered over the gate insulation film 23A. Furthermore, a channel mask film 25A, which is made up of SiN, is formed on an area corresponding to a channel region right above the gate electrode 22A and is etched.

In the terminal area in FIG. 3B, an insulation film 23B, which is made up of the same composition (SiN) and thickness as the insulation film 23A, is layered over the terminal electrodes 22B and then an amorphous silicon layer 24B, having the same thickness as the amorphous silicon layer 24A, is layered over the insulation film 23B.

In addition, in the display area in FIG. 3C, an n⁺type impurity doped amorphous silicon pattern 26A is formed on the amorphous silicon layer 24A and is adjoined with sides of the channel mask film 25A. Moreover, a metal is layered on the n⁺type impurity doped amorphous silicon pattern 26A so that a source-drain of the TFT 11C is constituted. For example, the above metal can be constructed by Ti, Al and Ti layers.

Subsequently, in the display area in FIG. 3D, a mask film 27A, which is made up of SiN, is layered so as to cover over the n⁺type impurity doped amorphous silicon and metal pattern 26A and the channel mask film 25A on the gate insulation film 23A. In addition, a contact hole 28A is provided in the mask film 27A at one side of the amorphous silicon pattern 26A. Furthermore, a transparent pixel electrode 29 is provided at the contact hole 28A and contacts the amorphous silicon pattern 26A. The transparent pixel electrode 29 corresponds to the transparent pixel electrode 11D in FIG. 2.

Simultaneously with steps in the display area in FIG. 3D, in the terminal area in FIG. 3D, a mask film 27B corresponding to the mask film 27A is layered on the insulation film 23B. Then contact holes 28B are formed to expose the terminal electrodes 22B. As shown in FIG. 4, in a liquid-crystal display device 52, IC devices 56 are connected to the terminal electrodes 22B via the contact holes 28B in the terminal area on a display panel 54 by tape automated bonding (TAB) leads (not shown).

The second glass base covers and seals the display area on the TFT glass base 21.

Generally, to cut production cost, after a plurality of liquid-crystal displays are produced on a surface of a large glass base, the large glass base is cut into each liquid-crystal display so that a plurality of liquid-crystal display devices are completed.

FIG. 5 is a sectional view illustrating the conventional liquid-crystal display device after a cutting step. Referring to FIG. 5, a first glass base 40, corresponding to the first TFT glass base 11 in FIG. 1, has a terminal area 47 including terminal electrodes 22B and a display area 48 surrounded by the terminal area 47. The first glass base 40 is sealed with a second glass base 49, sealing members 42 and spacers (not shown) such that the first glass base 40 and the second glass base 49 face each other. The terminal area 47 is not covered with the second glass base 49. Thus, the terminal area 47 is vulnerable to particles especially during the cutting step. In particular, when terminal electrodes 22B in the terminal area 47 are damaged mechanically by the particles, the damage makes it impossible to connect the liquid-crystal display to external circuits so that functions as a liquid-crystal display are lost.

SUMMARY OF THE INVENTION

It is a general object of the present invention to provide a Thin Film Transistor (TFT) liquid-crystal display device and method of the same in which the above-mentioned problems are eliminated.

A more specific object of the present invention is to provide a Thin Film Transistor (TFT) liquid-crystal display device and a method of fabricating the same that prevent particles from causing mechanical damages and improve yield of production of the same.

The above objects of the present invention are achieved by a liquid-crystal display device including: a first glass base; a second glass base facing the first glass base in a condition in which a space is defined between the first glass base and the second glass base; a liquid-crystal layer filling the space between the first glass base and the second glass base, and being sealed inside the first glass base, the second glass base and supporting members; a display area that is a surface area of the first glass base and faces the second glass base, and that includes thin-film transistors; a terminal area having terminal electrodes that connect electrically to corresponding thin-film transistors respectively; and projections provided on the terminal area such that heights of the projections are equal to or more than those of the thin-film transistors.

According to the present invention, the projections are provided in the terminal area so as to prevent terminal electrodes from damages caused by particles.

The objects of the present invention are also achieved by a method for producing a liquid-crystal display including the steps of: (a) forming a display area having thin-film transistors on a first glass base which surface faces a second glass base; and (b) forming a terminal area having terminal electrodes that connect electrically to the thin-film transistors respectively in a condition in which projections are provided in the terminal area and heights of the projections are substantially equal to or more than those of the thin film transistors.

According to the present invention, the projections are provided during the steps for producing the display area and the terminal area. In addition, the projections are made up of the same components as the thin-film transistors. Therefore, the projections can be provided without requiring any extra steps or any extra components.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

FIGS. 6A, 6B, 6C and 6D are sectional views illustrating production steps of a liquid-crystal display device according to an embodiment of the present invention. In these figures, every left side shows a display area including a TFT 11C and every right side shows a terminal area including pad electrodes 11A and 11B.

Figure 1:
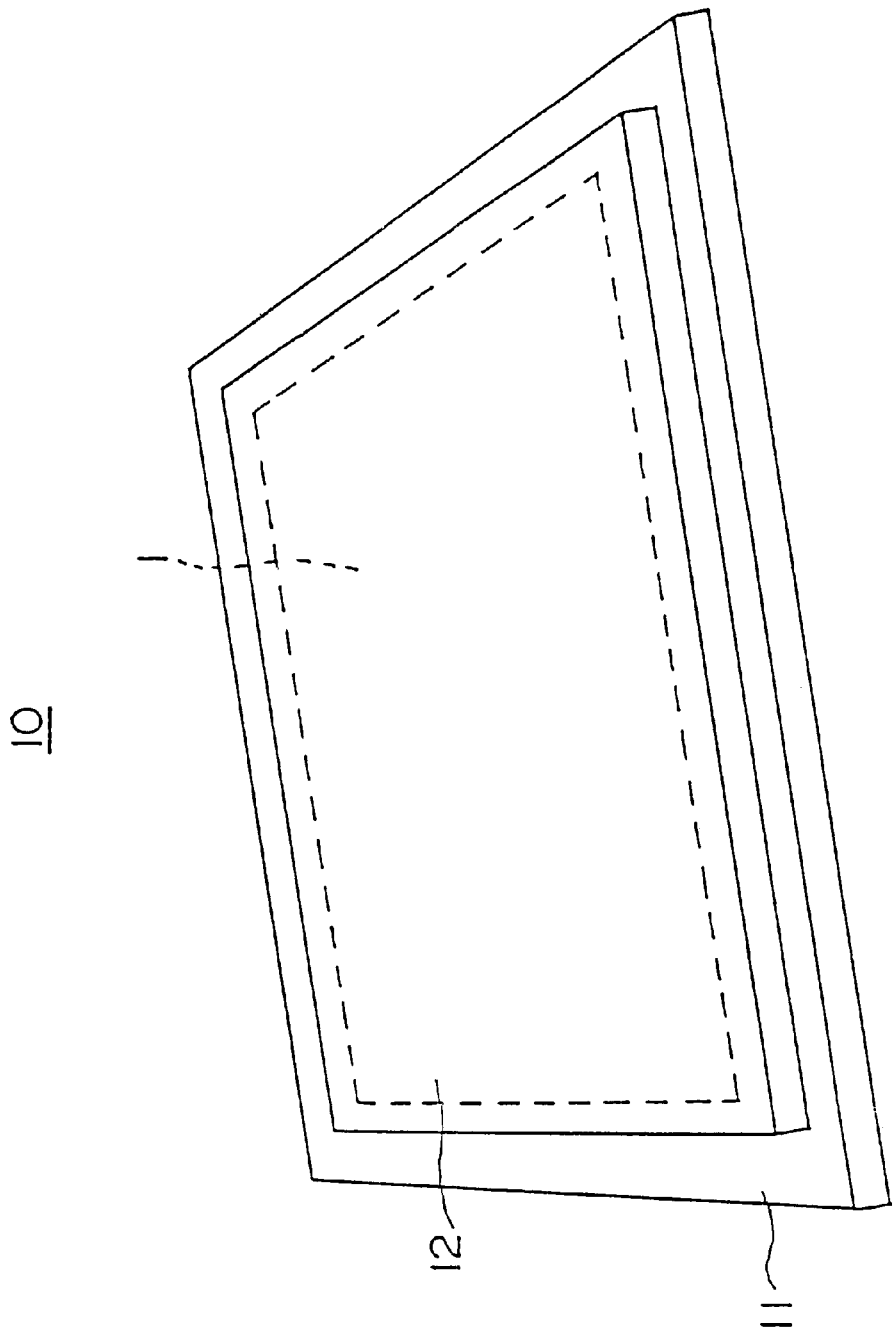
FIG. 1 shows a diagram of a conventional active-matrix-type liquid-crystal display device.
Figure 2:
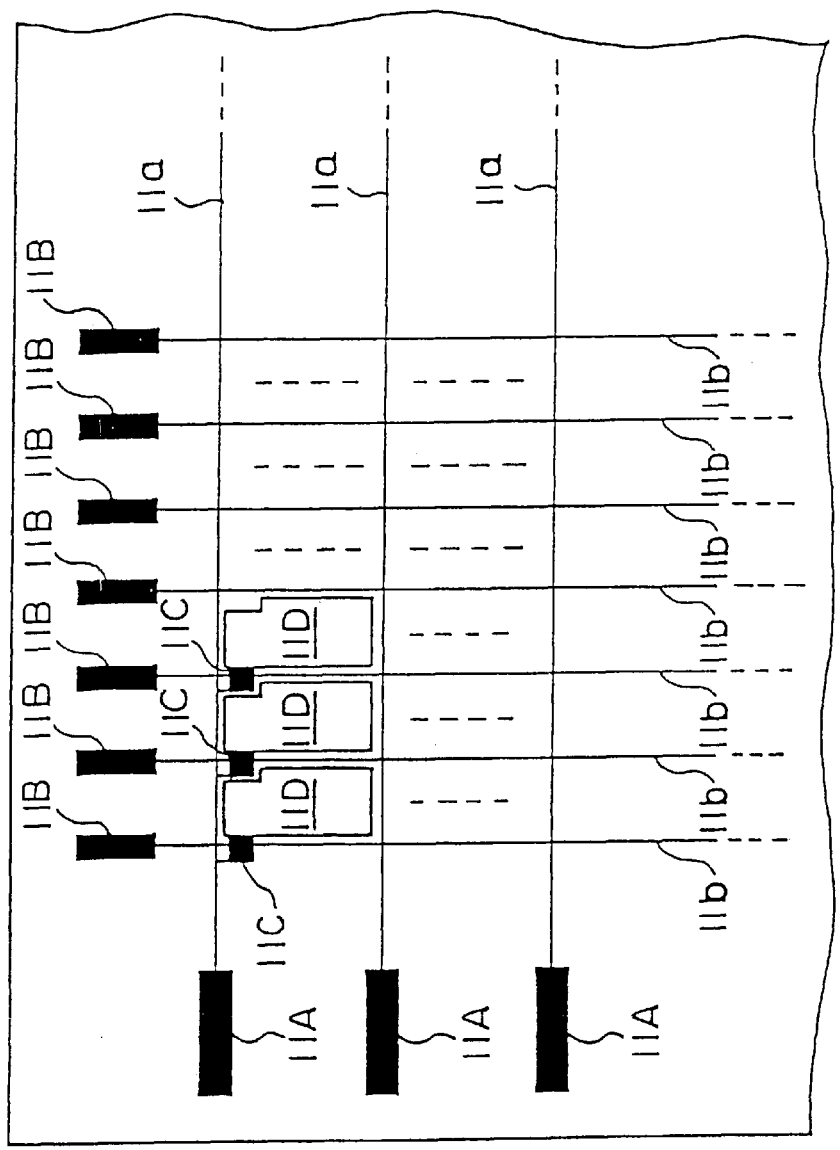
FIG. 2 shows a part of a TFT glass base 11 under magnification.
Figure 6:
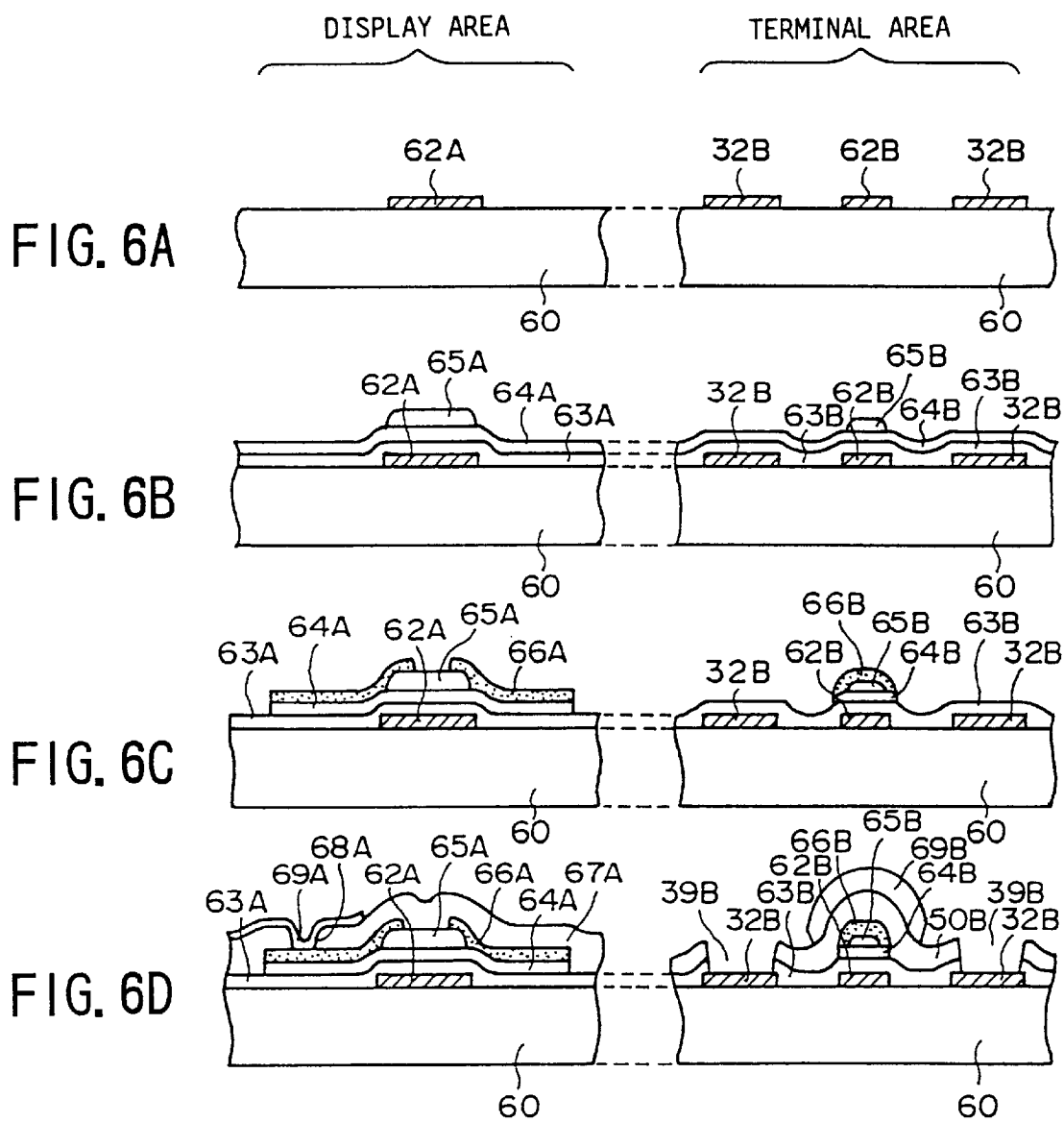
FIGS. 6A, 6B, 6C and 6D are sectional views illustrating production steps of a liquid-crystal display device according to an embodiment of the present invention.

Referring to FIG. 6A, in the display area, an Al—Nd or Al—Sc alloy pattern 62A that is connected to the scan electrode 11a is formed as a gate electrode on a glass base 60 corresponding to the first TFT glass base 11 in FIG. 1. Simultaneously, in the terminal area on the glass base 60, terminal electrodes 32B corresponding to the pad electrode 11A or 11B are formed in the same manner as the conventional method. In addition to terminal electrodes 32B, in this embodiment, a conductive pattern 62B, a thickness of which is the same as that of the terminal electrodes 32B, is formed between the terminal electrodes 32B as shown in FIG. 6A.

Subsequently, in the display area in FIG. 6B, a gate insulation film 63A that is made up of SiN is layered over the gate electrode 62A. Moreover, an n$^-$type impurity doped amorphous silicon layer 64A is layered over the gate insulation film 63A. Furthermore, a channel mask film 65A, which is made up of SiN, is formed on an area corresponding to a channel region right above the gate electrode 62A with patterning.

In the terminal area in FIG. 6B, an insulation film 63B, which is made up of the same composition and thickness as the insulation film 63A, is layered over the terminal electrodes 32B and the conductive pattern 62B at the same time as the insulation film 63A is layered. Moreover, an amorphous silicon layer 64B, a thickness of which is the same as that of the amorphous silicon layer 64A, is layered over the insulation film 63B at the same time as the amorphous silicon layer 64A is layered. Furthermore, a channel mask film 65B, which is made up of the same composition and thickness as the channel mask film 65A, is formed at the same time as 65A is formed.

In addition, in the display area in FIG. 6C, an n$^+$type impurity doped amorphous silicon pattern 66A is formed on the amorphous silicon layer 64A and is adjoined with both sides of the channel mask film 65A. Moreover, a metal is layered on the n$^+$type impurity doped amorphous silicon pattern 66A so that a source-drain of the TFT 11C is constituted. For example, the above metal can be constructed by Ti, Al and Ti layers.

In the terminal area in FIG. 6C, an n$^+$type impurity doped amorphous silicon pattern 66B is formed over the channel protection 65B at the same time as the amorphous silicon pattern 66A is formed. Also, a metal is layered on the n$^+$type impurity doped amorphous silicon pattern 66B. For example, the above metal can be constructed by Ti, Al and Ti layers. When the patterning step is performed with etching, an exposed surface area of the amorphous silicon layer 64B under the amorphous silicon pattern 66B is removed.

Subsequently, in the display area in FIG. 6D, a mask film 67A, which is made up of SiN, is layered so as to cover over the n$^+$type impurity doped amorphous silicon pattern 66A, the channel mask film 65A and the amorphous silicon layer 64A. Then a transparent pixel electrode 69A is provided with a contact hole 68A opened on the amorphous silicon pattern 66A.

Moreover, in the terminal area in FIG. 6D, a mask film 50B, which is made up of SiN, is layered so as to cover over the amorphous silicon layer 66B and amorphous silicon layer 64B, and then a transparent pixel electrode 69B is formed on the mask film 50B and the amorphous silicon layer 66B with patterning. A contact hole 39B is provided on each terminal electrode 32B.

In the etching step, an etching stopper method, in which a channel insulation film is used to protect from etching, is applied. Alternately, a channel etching method, in which an over etching is performed to a channel without a channel insulation film, can be applied.

Figure 3:
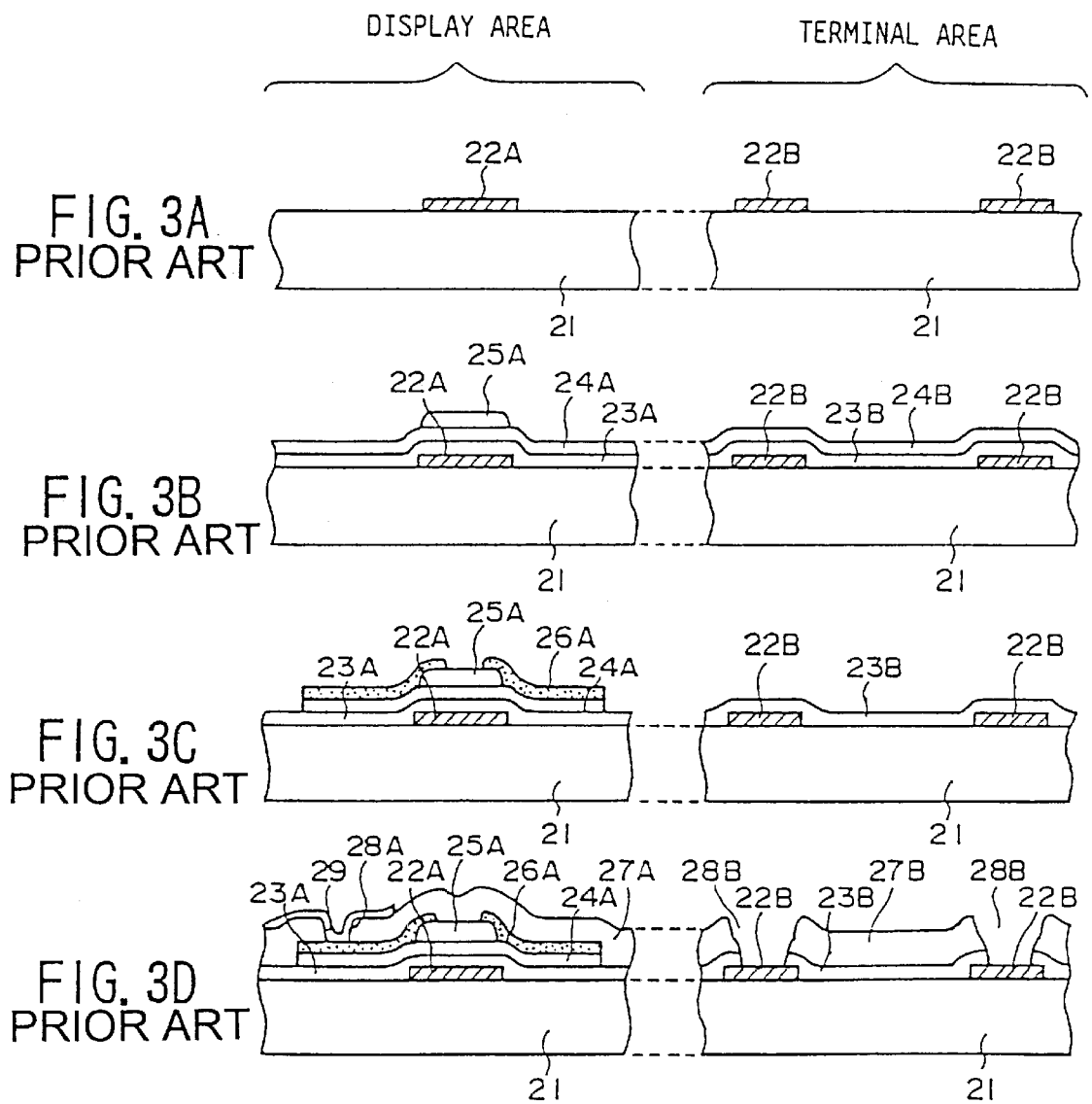
FIGS. 3A, 3B, 3C and 3D show sectional views illustrating production steps of a conventional liquid-crystal display device.
Figure 4:
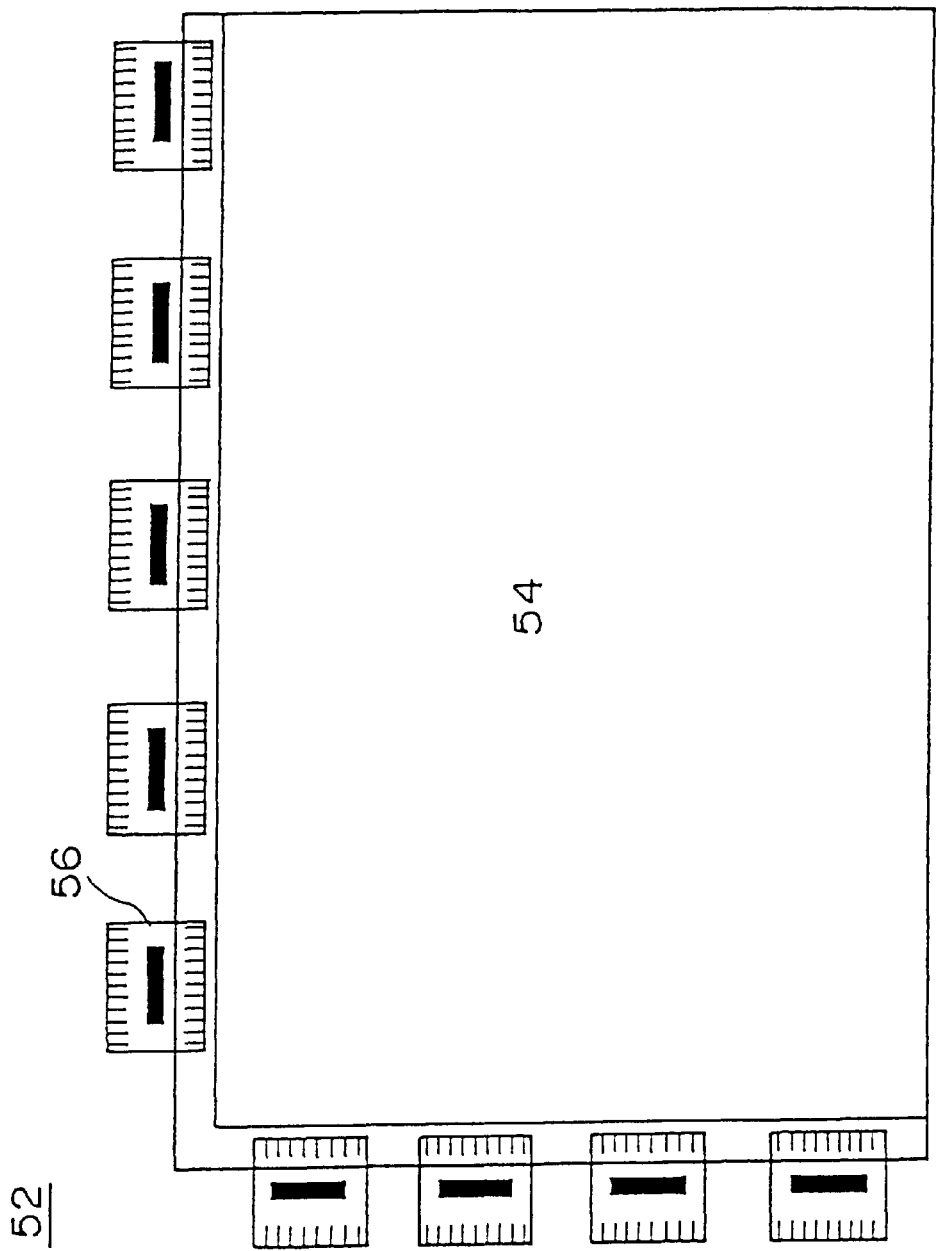
FIG. 4 shows a diagram illustrating a liquid-crystal display mounting IC devices.
Figure 5:
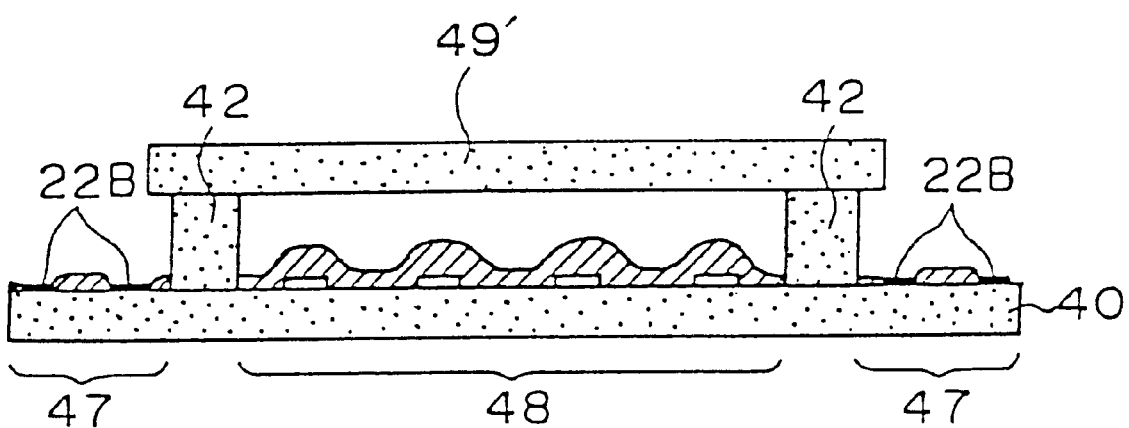
FIG. 5 is a sectional view illustrating the conventional liquid-crystal display device after a cutting step.

In this embodiment, during the above-mentioned steps for the terminal area, the conductive pattern 62B is formed between two terminal electrodes 32B. In the conventional method, between two terminal electrodes 22B in the terminal area as shown FIG. 3D, the amorphous silicon layer 24B is formed on the insulation film 23B that is provided on the TFT glass base 21. Moreover, the mask film 27B is layered on the insulation film layer 23B after the etching step. Thus, a flat surface is formed between the two terminal electrodes 22B. On the contrary, in the present embodiment, in the terminal area as shown in FIG. 6D, the conductive pattern 62B is provided between the terminal electrodes 32B, and the same films used in the display area are layered on the conductive pattern 62B simultaneously with the steps performed in the display area. Therefore, the height from a surface of the TFT glass base 60 up to the top of the layers in the terminal area is eventually equal to or more than the height from the surface of the TFT glass base 60 up to the top of the layers at display area. In addition, the projection fits within a relatively small area of the conductive pattern 62B. In the same steps for the display area, the projection between the terminal electrodes is provided with the same compositions as the devices on the display area. Therefore, any extra step and particular material for the projection are not required. Moreover, the projection is adjacent to the terminal electrodes so as to protect them from particles.

A thickness of each film composing the projection is as follows:

| | |
|---|---|
| conductive pattern 62B | 200 nm |
| gate insulation film 63B | 400 nm |
| amorphous silicon layer 64B | 40 nm |
| insulation film 65B | 400 nm |
| n$^+$ type amorphous silicon pattern 66B | 50 nm |
| mask film 50B | 300 nm |
| transparent electrode 69B | 100 nm |

The thickness of the n$^+$type amorphous silicon pattern 66B includes a thickness of the metal constructed by Ti, Al and Ti layers.

The total thickness of the projection is approximately 1500 nm (1.5 $\mu$m).

Figure 7:
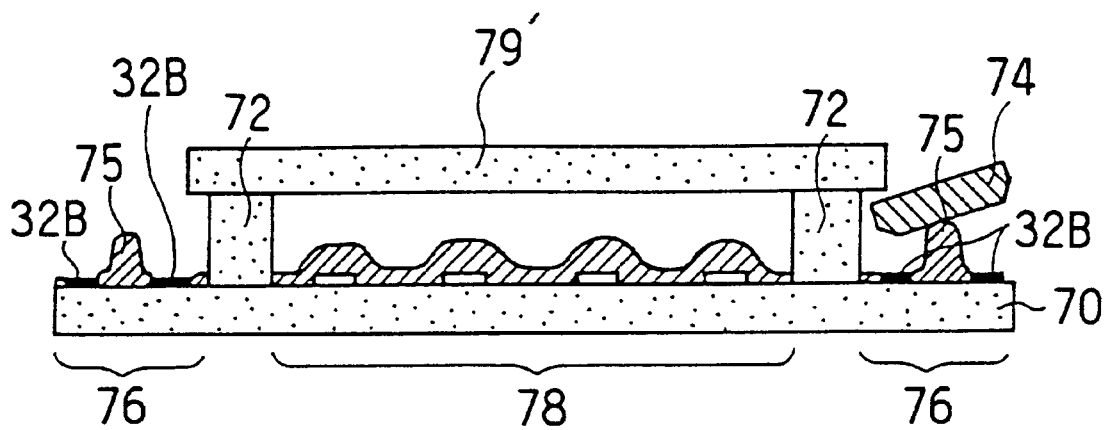
FIG. 7 is a sectional view illustrating the liquid-crystal display according to the present invention.

In this manner, a plurality of liquid-crystal displays having the display area and terminal area are provided on a glass base. Then the glass base is cut into each piece of liquid-crystal display. How the present invention can protect the terminal electrodes from particles caused by cutting the glass base will now be described. FIG. 7 is a sectional view illustrating the liquid-crystal display according to the present invention.

Referring to FIG. 7, in a liquid-crystal display device 71, a first glass base 70, having a terminal area 76 including projections 75 and terminal electrodes 32B and a display area 78 surrounded by the terminal area 76, and a second glass base 79' are supported by sealing members 72 and spacers (not shown) and face each other.

In FIG. 7, the height of the projection 75 provided between two terminal electrodes 32B is approximately 1.5 $\mu$m. In addition, a distance between the first glass base 70 and the second glass base 79' is about 2 to 3 $\mu$m. When a size of a particle 74 caused by cutting glass bases is larger than a specification of a few $\mu$m distance between the terminal electrodes, the present invention can prevent the particle from causing contact with and damages to surfaces of the terminal electrodes.

As mentioned above, according to the present invention, devices on the display area can be protected from the particles by sealing with the second glass base and sealing members. In addition, contact with and damages to surfaces of the terminal electrodes, which are caused by the particles, can be eliminated.

The present invention is not limited to the specifically disclosed embodiments, variations and modifications, and other variations and modifications may be made without departing from the scope of the present invention.

The present application is based on Japanese Priority Application No. 10-192010 filed on Jul. 7, 1998, the entire contents of which are hereby incorporated by reference.

What is claimed is:

1. A liquid-crystal display device comprising:

a first insulation base;

a second insulation base facing said first insulation base in a condition in which a space is defined between said first insulation base and said second insulation base;

a liquid-crystal layer filling the space between said first insulation base and said second insulation base, and being sealed inside said first insulation base, said second insulation base and supporting members;

a display area that is a surface area of said first insulation base and faces said second insulation base, and that includes thin-film transistors;

a terminal area provided outside said supporting members and having terminal electrodes that connect electrically to corresponding said thin-film transistors respectively;

projections provided in said terminal area such that heights of said projections are equal to or more than those of said thin-film transistors in said display area; and wherein each of said projections includes a conductive pattern that is formed on the first insulation base and is close to at least one of the terminal electrodes.

2. The liquid-crystal display device as claimed in claim 1, wherein said projections have a layer structure substantially identical to that of the thin-film transistors in said display area.

3. The liquid-crystal display device as claimed in claim 1, wherein each of said thin film transistors in said display area comprises:

a gate electrode formed on said first insulation base;

a gate insulation film layered over the gate electrode on said first insulation base;

a channel layer formed on the gate insulation film;

a channel mask film formed right above the gate electrode;

a source region and a drain region that cover both sides of the channel mask film;

a mask insulation film layered over the gate insulation film and the source and drain regions; and a pixel electrode formed on the mask insulation film and contacting the drain region through a contact hole provided in the mask insulation film, and wherein each of said projections provided on said terminal area comprises:

a conductive pattern adjacent to the terminal electrode and having substantially the same components and thickness as the gate electrode;

a first insulation film layered over the conductive pattern and having substantially the same components and thickness as the gate insulation film;

a first semiconductor layer formed on the first insulation film;

a second insulation film formed on the first semiconductor layer and having substantially the same components and thickness as the channel mask film;

a second semiconductor layer formed on the second insulation film and having substantially the same components and thickness as the source region and the drain region;

a third insulation film layered over the second semiconductor layer on the first semiconductor layer and having substantially the same components and thickness as the mask insulation film; and a first pixel electrode provided on the third insulation film.

4. A method for fabricating a liquid-crystal display comprising the steps of:

(a) forming a display area having thin film transistors on a first insulation base which surface faces a second insulation base so that said display area is surrounded with supporting members supporting said second insulation base; and (b) forming a terminal area outside said supporting members and having terminal electrodes that connect electrically to the thin film transistors respectively in a condition in which projections are provided in the terminal area and heights of the projections are substantially equal to or more than those of the thin-film transistors in said display area; and wherein each of said projections includes a conductive pattern that is formed on the first insulation base and is close to at least one of the terminal electrodes.

5. The method as claimed in claim 4, wherein the steps (a) and (b) are performed simultaneously.

6. The method as claimed in claim 4, wherein said step (a) for each of said thin-film transistors comprises the step of:

(i) forming a gate electrode on the first insulation base;

(ii) layering a gate insulation film over the gate electrode on said first insulation base;

(iii) forming a channel layer on the gate insulation film;

(iv) forming a channel mask film on the channel layer right above the gate electrode;

(v) providing a source region and a drain region that cover both side of the channel mask film;

(vi) layering a mask insulation film over the gate insulation film and the source and drain regions;

(vii) forming a pixel electrode on the mask insulation film which pixel electrode contacts the drain region through a contact hole provided in the mask insulation film, and wherein the step (b) for each of said projections comprises the steps of:

(1) forming a conductive pattern simultaneously with the step (i);

(2) layering a first insulation film simultaneously with the step (ii);

(3) forming a first semiconductor layer corresponding to the channel layer simultaneously with the step (iii);

(4) forming a second insulation film on the first semiconductor layer right above the conductive pattern simultaneously with the step (iv) in a condition in which the second insulation film has substantially the same components and thickness as the channel mask film;

(5) forming a second semiconductor layer on the second insulation film simultaneously to the step (v) in a condition in which the second semiconductor layer has substantially the same components and thickness as the source region and the drain region; and (6) layering a third insulation film over the second semiconductor layer on the first insulation film simultaneously with the step (vi) in a condition in which the third insulation film has substantially the same components and thickness as the mask insulation film.

* * * * *

UNITED STATES PATENT AND TRADEMARK OFFICE
CERTIFICATE OF CORRECTION

PATENT NO. : 6,459,466 B1
DATED : October 1, 2002
INVENTOR(S) : Tetsuya Fujikawa It is certified that error appears in the above-identified patent and that said Letters Patent is hereby corrected as shown below:

<u>Title page,</u>
Item [54], the correct title should read as follows:

-- A LCD DEVICE COMPRISES PROJECTIONS IN A TERMINAL AREA FORMED OUTSIDE THE SEALING MEMBERS, AND HAVING THE SAME HEIGHTS AND LAYER STRUCTURES AS TFTs FORMED IN A DISPLAY AREA --

<u>Column 7,</u>
Line 1, delete "a conductive pattern adjacent to the terminal electrode and" insert -- said inductive pattern --.

Signed and Sealed this

Tenth Day of June, 2003

JAMES E. ROGAN
*Director of the United States Patent and Trademark Office*